United States Patent
Choi et al.

(10) Patent No.: US 10,032,729 B2
(45) Date of Patent: Jul. 24, 2018

(54) APPARATUS AND METHOD FOR GENERATING IDENTIFICATION KEY

(71) Applicant: ICTK CO., LTD., Gyeonggi-do (KR)

(72) Inventors: Byong Deok Choi, Seoul (KR); Dong Kyue Kim, Seoul (KR)

(73) Assignee: ICTK Holdings Co., Ltd., Gyeonggi-do (KR)

( * ) Notice: Subject to any disclaimer, the term of this patent is extended or adjusted under 35 U.S.C. 154(b) by 151 days.

(21) Appl. No.: 15/028,330

(22) PCT Filed: Feb. 17, 2014

(86) PCT No.: PCT/KR2014/001251
§ 371 (c)(1),
(2) Date: Apr. 8, 2016

(87) PCT Pub. No.: WO2015/053441
PCT Pub. Date: Apr. 16, 2015

(65) Prior Publication Data
US 2016/0247769 A1    Aug. 25, 2016

(30) Foreign Application Priority Data
Oct. 10, 2013 (KR) .................. 10-2013-0120297

(51) Int. Cl.
*H03K 19/00* (2006.01)
*H01L 23/00* (2006.01)
(Continued)

(52) U.S. Cl.
CPC ........ *H01L 23/573* (2013.01); *G06F 17/5072* (2013.01); *G06F 21/73* (2013.01);
(Continued)

(58) Field of Classification Search
CPC ............. H01L 23/573; H01L 21/76877; H01L 21/823475; H01L 23/5226; H01L 23/528;
(Continued)

(56) References Cited

U.S. PATENT DOCUMENTS 9,722,786 B2* 8/2017 Kim ...................... H04L 9/0866
2006/0063286 A1 3/2006 Bidermann et al.
(Continued)

FOREIGN PATENT DOCUMENTS

EP 3043281 A1 7/2016
KR 100926214 B1 11/2009
(Continued)

OTHER PUBLICATIONS

ISA Korean Intellectual Property Office, International Search Report Issued in Application No. PCT/KR2014/001251, dated Jul. 17, 2014, WIPO, 4 pages.

*Primary Examiner* — Daniel D Chang
(74) *Attorney, Agent, or Firm* — McCoy Russell LLP

(57) ABSTRACT

Provided is an apparatus for generating an identification key by using process variation in a conductive layer manufacturing process. The apparatus may include a first contact connected to a first conductive layer included in a semiconductor chip, wherein a first node is formed by an electrical connection between the first conductive layer and the first contact, a second contact connected to a second conductive layer included in the semiconductor chip, wherein a second node is formed by an electrical connection between the second conductive layer and the second contact, and wherein a value of a spacing between the first contact and the second contact is smaller than a minimum spacing value that guarantees that the first node and the second node are not shorted on a patterning layout, and a reader configured
(Continued)

to determine whether the first node and the second node are electrically shorted and to provide the identification key.

13 Claims, 9 Drawing Sheets

(51) Int. Cl.
| | |
|---|---|
| *G06F 21/73* | (2013.01) |
| *G06F 17/50* | (2006.01) |
| *H01L 21/768* | (2006.01) |
| *H01L 21/8234* | (2006.01) |
| *H01L 23/522* | (2006.01) |
| *H01L 23/528* | (2006.01) |
| *H01L 27/02* | (2006.01) |
| *H01L 27/06* | (2006.01) |
| *H04L 9/32* | (2006.01) |
| *G09C 1/00* | (2006.01) |
| *H04L 9/08* | (2006.01) |

(52) U.S. Cl.
CPC .......... *G09C 1/00* (2013.01); *H01L 21/76877* (2013.01); *H01L 21/823475* (2013.01); *H01L 23/528* (2013.01); *H01L 23/5226* (2013.01); *H01L 27/0207* (2013.01); *H01L 27/0629* (2013.01); *H04L 9/0866* (2013.01); *H04L 9/3278* (2013.01); *H04L 2209/12* (2013.01)

(58) Field of Classification Search
CPC ............. H01L 27/0207; H01L 27/0629; G06F 17/5072; G06F 21/73; G09C 1/00; H04L 9/0866; H04L 9/3278; H04L 2209/12
USPC .......................................................... 326/8
See application file for complete search history.

(56) References Cited

U.S. PATENT DOCUMENTS

| | | | |
|---|---|---|---|
| 2010/0070777 A1 | 3/2010 | Salters et al. | |
| 2013/0101114 A1* | 4/2013 | Kim ..................... | G06F 21/73 380/44 |
| 2015/0222430 A1* | 8/2015 | Kim ..................... | H04L 9/0866 380/44 |

FOREIGN PATENT DOCUMENTS

| | | |
|---|---|---|
| KR | 101139630 B1 | 5/2012 |
| KR | 1020120089607 A | 8/2012 |
| WO | 2010134192 A1 | 11/2010 |
| WO | 2011088074 A2 | 7/2011 |
| WO | 2012077856 A1 | 6/2012 |

* cited by examiner

_(1)_

APPARATUS AND METHOD FOR GENERATING IDENTIFICATION KEY

Cross Reference to Related Applications

The present application is a U.S. National Phase of International Patent Application Serial No. PCT/KR2014/001251, entitled "APPARATUS AND METHOD FOR GENERATING IDENTIFICATION KEY," filed on Feb. 17, 2014, which claims priority to Korean Patent Application No. 10-2013-0120297, entitled "APPARATUS AND METHOD FOR GENERATING IDENTIFICATION KEY," filed on Oct. 10, 2013, the entire contents of each of which are hereby incorporated by reference for all purposes.

TECHNICAL FIELD

The following description relates to an apparatus and method for generating an identification key for hardware security, and more particularly, to an apparatus and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physically unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an interlayer contact or a via is formed between conductive layers of a semiconductor based on a semiconductor process variation.

DISCLOSURE OF INVENTION

Technical Solutions

According to an aspect of the present invention, there is provided an apparatus for generating an identification key, the apparatus including a first contact connected to a first conductive layer included in a semiconductor chip, a first node being formed by electrically connecting the first contact and the first conductive layer, a second contact connected to a second conductive layer included in the semiconductor chip, a second node being formed by electrically connecting the second contact and the second conductive layer, and a value of a spacing between the first contact and the second contact in a patterning layout of the semiconductor chip being less than a minimum spacing value guaranteeing that the first node and the second node are not shorted, and a reader configured to determine whether the first node and the second node are electrically shorted and to generate an identification key.

The value of the spacing between the first contact and the second contact may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range, and the second threshold may be an upper limit value of the range of the values of the spacing to allow the difference between the probability that the first node and the second node are shorted and the probability that the first node and the second node are not shorted to be within the predetermined error range.

Also, the first threshold may be greater than a maximum value of the spacing guaranteeing that the first node and the second node are shorted, and the second threshold may be less than a minimum value of the spacing guaranteeing that the first node and the second node are open.

Whether the first node and the second node are shorted may be randomly determined by a process variation occurring in a process of manufacturing the semiconductor chip.

An edge of the first node or an edge of the second node may protrude further outwards than an edge of the first conductive layer or an edge of the second conductive layer.

At least one of the first conductive layer and the second conductive layer may correspond to at least one of an N-well, a P-well, an N+ active, a P+ active, a poly and a metal included in the semiconductor chip.

According to another aspect of the present invention, there is provided an apparatus for generating an N-bit identification key, the apparatus including N unit cells that each generate a 1-bit digital value, wherein at least one of the N unit cells includes a first contact connected to a first conductive layer included in a semiconductor chip, a first node being formed by electrically connecting the first contact and the first conductive layer, a second contact connected to a second conductive layer included in the semiconductor chip, a second node being formed by electrically connecting the second contact and the second conductive layer, and a value of a spacing between the first contact and the second contact in a patterning layout of the semiconductor chip being less than a minimum spacing value guaranteeing that the first node and the second node are not shorted, and a reader configured to determine whether the first node and the second node are electrically shorted and to generate an identification key.

The value of the spacing between the first contact and the second contact may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range, and the second threshold may be an upper limit value of the range of the values of the spacing to allow the difference between the probability that the first node and the second node are shorted and the probability that the first node and the second node are not shorted to be within the predetermined error range.

Also, the first threshold may be greater than a maximum value of the spacing guaranteeing that the first node and the second node are shorted, and the second threshold may be less than a minimum value of the spacing guaranteeing that the first node and the second node are open.

Whether the first node and the second node are shorted may be randomly determined by a process variation occurring in a process of manufacturing the semiconductor chip.

According to another aspect of the present invention, there is provided a method of manufacturing an apparatus generating an identification key, the method including forming a first contact connected to a first conductive layer and a second contact connected to a second conductive layer in a semiconductor chip, a first node being formed by electrically connecting the first contact and the first conductive layer, and a second node being formed by electrically connecting the second contact and the second conductive layer, and the method includes forming a reader configured to determine whether the first contact and the second contact are electrically shorted, and a spacing between the first contact and the second contact in a patterning layout of the semiconductor chip has a value less than a minimum spacing value guaranteeing that the first node and the second node are not shorted.

The spacing between the first contact and the second contact may be formed to have a value equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range, and the second threshold may be an upper limit value of the range of the values of the spacing to allow the difference between the probability that the first node and the second node are shorted and the probability that the first node and the second node are not shorted to be within the predetermined error range.

An edge of the first node or an edge of the second node may protrude further outwards than an edge of the first conductive layer or an edge of the second conductive layer.

According to another aspect of the present invention, there is provided a method of designing an apparatus generating an identification key, the method including disposing a first contact connected to a first conductive layer and a second contact connected to a second conductive layer in a semiconductor chip, a first node being formed by electrically connecting the first contact and the first conductive layer, and a second node being formed by electrically connecting the second contact and the second conductive layer, and disposing a reader in the semiconductor chip, the reader being configured to determine whether the first contact and the second contact are electrically shorted, wherein a value of a spacing between the first contact and the second contact in a patterning layout of the semiconductor chip is less than a minimum spacing value guaranteeing that the first node and the second node are not shorted.

The value of the spacing between the first contact and the second contact may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range, and the second threshold may be an upper limit value of the range of the values of the spacing to allow the difference between the probability that the first node and the second node are shorted and the probability that the first node and the second node are not shorted to be within the predetermined error range.

An edge of the first node or an edge of the second node may protrude further outwards than an edge of the first conductive layer or an edge of the second conductive layer.

According to another aspect of the present invention, there is provided a method of generating an identification key, the method including generating a potential difference between a first node and a second node included in a semiconductor chip, the first node being formed by electrically connecting the first contact and the first conductive layer, the second node being formed by electrically connecting the second contact and the second conductive layer, and a value of a spacing between the first contact and the second contact in a patterning layout of the semiconductor chip being less than a minimum spacing value according to a design rule that ensures that the first node and the second node are not shorted, and determining, by a reader, whether the first node and the second node are electrically shorted and generating an identification key.

The value of the spacing between the first contact and the second contact may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range, and the second threshold may be an upper limit value of the range of the values of the spacing to allow the difference between the probability that the first node and the second node are shorted and the probability that the first node and the second node are not shorted to be within the predetermined error range.

Whether the first node and the second node are shorted may be randomly determined by a process variation occurring in a process of manufacturing the semiconductor chip.

An edge of the first node or an edge of the second node may protrude further outwards than an edge of the first conductive layer or an edge of the second conductive layer.

BEST MODE FOR CARRYING OUT THE INVENTION

Figure 1:
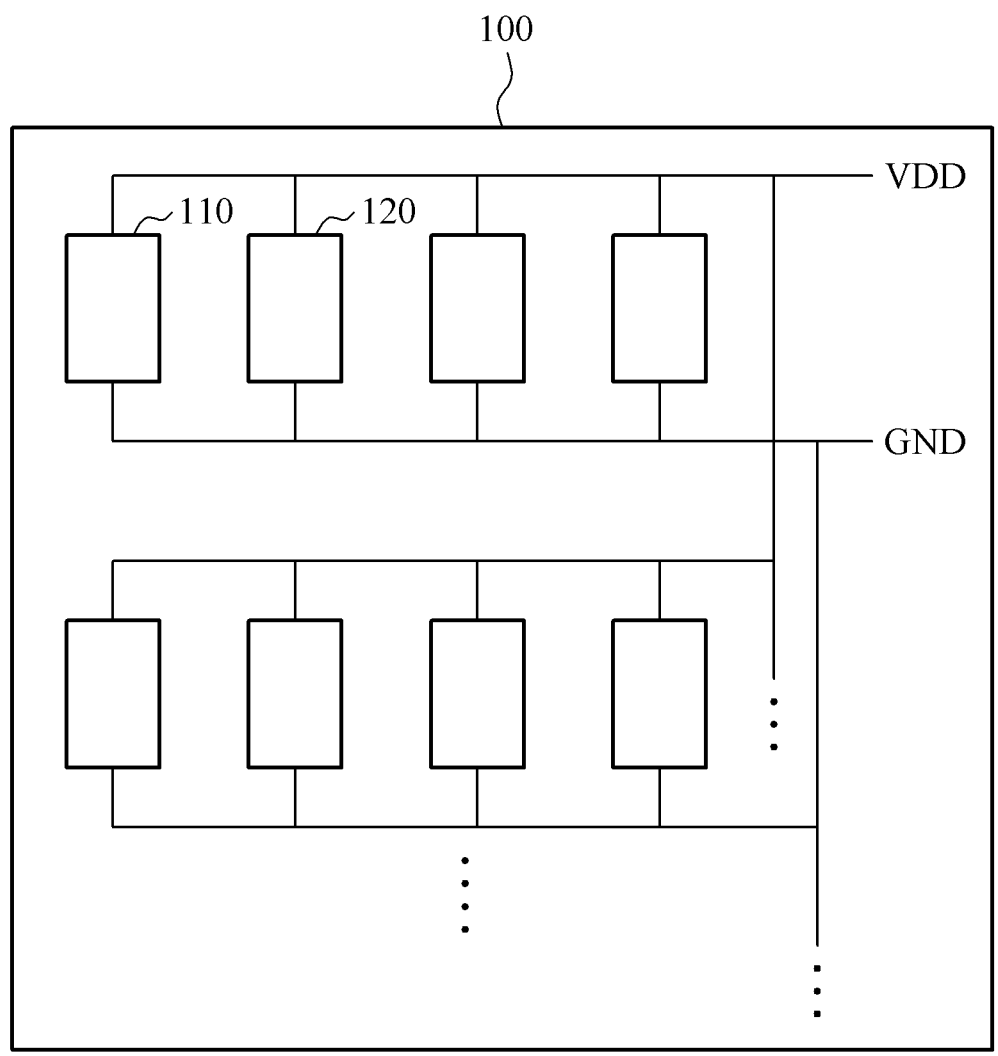
FIG. 1 is a block diagram illustrating an apparatus for generating an N-bit identification key according to an embodiment.

Hereinafter, some embodiments will be described in detail with reference to the accompanying drawings. The inventive concept, however, should not be construed as limited to the embodiments set forth herein. Like reference numerals in the drawings refer to like elements throughout the present disclosure.

The terms used herein are mainly selected from general terms currently being used in light of functions in the present disclosure. Yet, the meanings of the terms used herein may be changed to keep up with the intent of an operator in the art, a custom, or the appearance of new technologies.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

FIG. 1 is a block diagram illustrating an apparatus 100 for generating an N-bit identification key according to an embodiment.

The apparatus 100 may include N unit cells, for example, unit cells 110 and 120, where N is a natural number.

Each of the N unit cells may provide a 1-bit digital value, and accordingly the apparatus 100 may provide an identification key of N-bits.

The apparatus 100 may generate an identification key using a semiconductor process. The generated identification key may have randomness, but may be invariant over time.

For reliability of the generated identification key, time-invariance that is invariant over time and randomness (referred to as "arbitrariness") of the generated identification key may be most important.

For example, the apparatus 100 may be included as at least a portion of a semiconductor chip. In this example, whether nodes formed in a semiconductor manufacturing process are shorted may be randomly determined, and may not change based on time or use environment, and thus an identification key may remain unchanged once the identification key is generated.

To implement the apparatus 100, whether conductive layers are shorted may be probabilistically determined by setting a spacing between contacts (or vias) to be less than a minimum spacing value according to a design rule that ensures an electrical short circuit. The apparatus 100 may generate an identification key having randomness. Hereinafter, a value of the spacing may refer to a value of a gap between contacts.

In an existing semiconductor process, when nodes of conductive layers are randomly shorted or open, the process may be determined to fail. However, the above process failure may be used to generate an identification key having randomness. In other words, a random identification key may be generated beyond a predetermined range of values of a spacing.

Each of unit cells may include a first contact, a second contact and a reader. An identification key generation process and a configuration of each of the unit cells 110 and 120 will be further described with reference to FIGS. 2 and 3.

An apparatus for generating an identification key may include a first contact, a second contact and a reader. Nodes may be shorted or open based on a value of a spacing between the first contact connected to a first conductive layer and the second contact connected to a second conductive layer. A first node may be formed by electrically connecting the first conductive layer and the first contact, and a second node may be formed by electrically connecting the second conductive layer and the second contact. The reader may determine whether the first node and the second node are electrically shorted. The above configuration will be further described with reference to FIGS. 5 and 6.

Even though a probability that the first contact and the second contact are shorted and a probability that the first contact and the second contact are not shorted are adjusted to have the same value, for example, ½, by adjusting the value of the spacing between the first contact and the second contact, the probabilities may not be probabilistically guaranteed to be exactly the same. The probability that the first contact and the second contact are shorted and the probability that the first contact and the second contact are not shorted may be represented by, for example, digital values of "0" and "1," respectively.

The value of the spacing may be a minimum spacing value according to a design rule that ensures that the first node and the second node are electrically open. Hereinafter, unless otherwise stated, the design rule will be understood as a design rule that ensures that the first node and the second node are electrically open.

When a value of the spacing between the first contact and the second contact approaches a maximum spacing value guaranteeing that the first node and the second node are shorted, a probability that nodes are shorted may increase. When the value of the spacing between the first contact and the second contact approaches a minimum spacing value guaranteeing that the first node and the second node are open, a probability that the nodes are open may increase. When one of the probabilities increases, randomness of a generated identification key may decrease.

Figure 2:
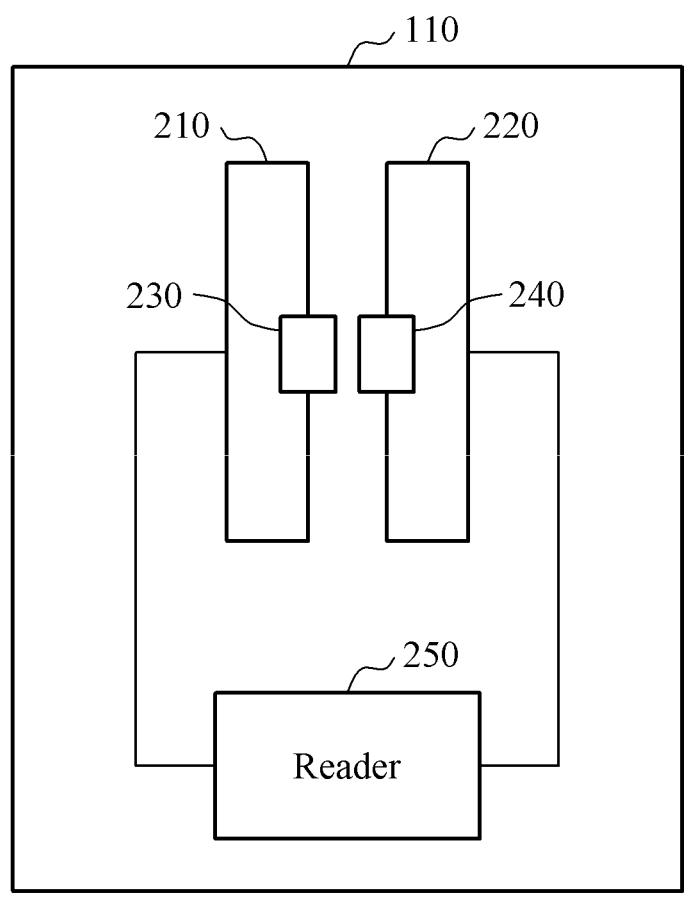
FIG. 2 is a diagram illustrating a configuration of a unit cell 110 of an apparatus for generating an identification key according to an embodiment.

FIG. 2 is a diagram illustrating a configuration of a unit cell 110 of an apparatus for generating an identification key according to an embodiment.

The unit cell 110 may include a first conductive layer 210, a second conductive layer 220, a first contact 230, a second contact 240 and a reader 250 included in a semiconductor chip.

A value of a spacing between the first contact 230 and the second contact 240 may be equal to or greater than a first threshold and equal to or less than a second threshold. The first threshold and the second threshold may be less than a minimum spacing value according to a design rule that ensures that a first node and a second node are electrically open. The first node may be formed by electrically connecting the first conductive layer 210 and the first contact 230, and the second node may be formed by electrically connecting the second conductive layer 220 and the second contact 240.

The first threshold and the second threshold may correspond to a predetermined error range in which a probability that the first node and the second node are shorted and a probability that the first node and the second node are not shorted have the same value, for example, ½, by adjusting the value of the spacing between the first contact 230 and the second contact 240.

The first threshold may be, for example, a lower limit value of a range of values of the spacing to allow a difference between the probability that the first node and the second node are shorted and the probability that the first node and the second node are not shorted to be within a predetermined error range.

The second threshold may be, for example, an upper limit value of the range of the values of the spacing to allow the difference between the probability that the first node and the second node are shorted and the probability that the first node and the second node are not shorted to be within the predetermined error range.

An edge of the first contact or an edge of the second contact may protrude further outwards than an edge of the first conductive layer 210 or an edge of the second conductive layer 220.

At least one of the first conductive layer 210 and the second conductive layer 220 may be a conductive wire included in a semiconductor chip. However, this is merely an example, and a conductive layer may be an arbitrary conductive element.

For example, at least one of the first conductive layer 210 and the second conductive layer 220 may correspond to an N-well, a P-well, an N+ active, a P+ active, a poly and a metal.

In an example, each of the first conductive layer 210 and the second conductive layer 220 may be at least a portion of wires patterned in parallel to each other.

In another example, the first conductive layer 210 or the second conductive layer 220 may be at least a portion of wires that are individually patterned.

The first node and the second node may be included in separate conductive layers or in the same conductive layer.

The reader 250 may determine whether the first node and the second node are electrically shorted.

When the first node and the second node are determined to be shorted, the reader 250 may output a digital value of "0." When the first node and the second node are determined not to be shorted, the reader 250 may output a digital value of "1." This will be further described with reference to FIGS. 5 and 6.

Whether the first node and the second node are shorted may be randomly determined by a process variation occurring in a semiconductor chip.

Figure 3:
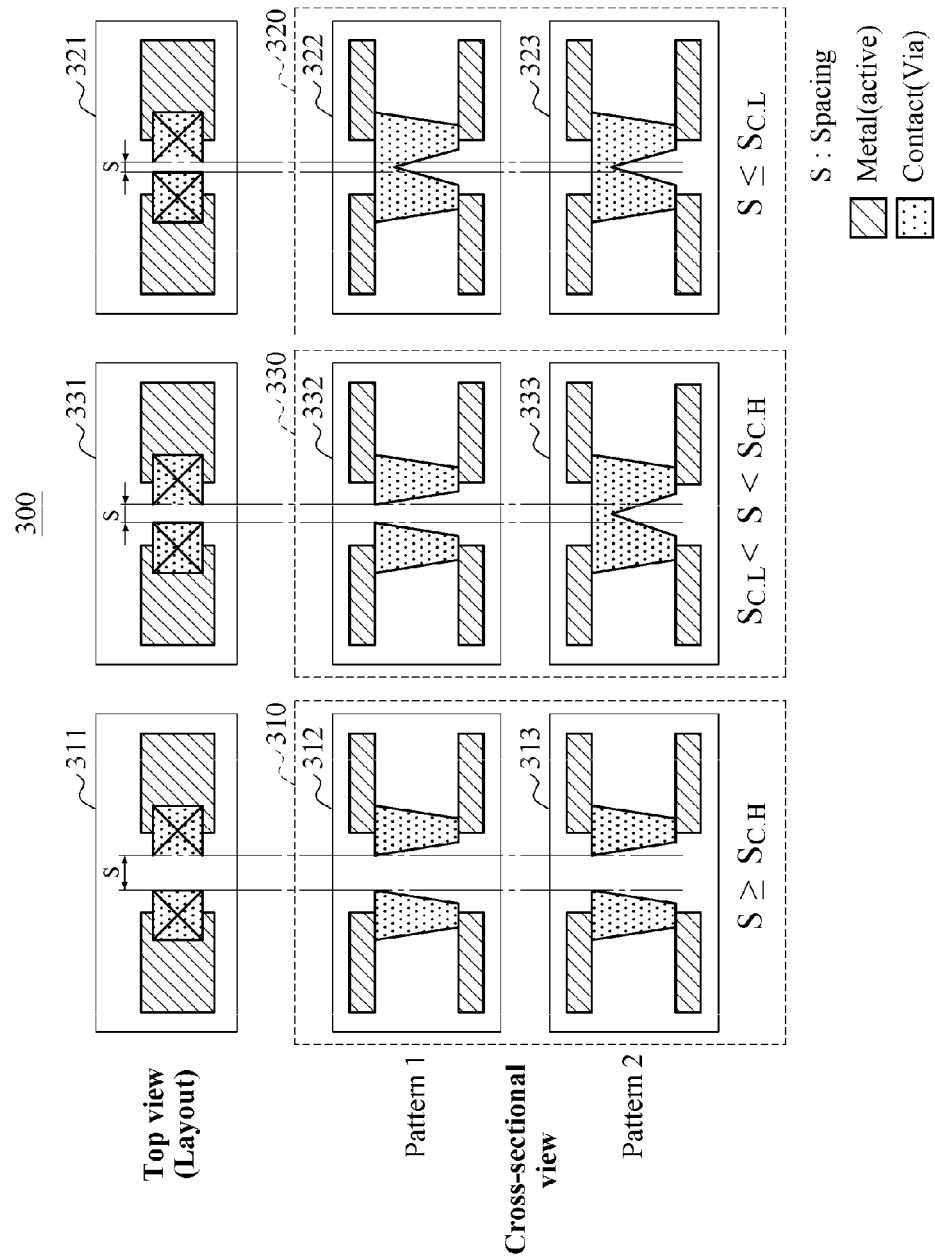
FIG. 3 is a diagram provided to describe a process of generating an identification key by determining a value of a spacing between contacts according to an embodiment.

FIG. 3 is a diagram provided to describe a process of generating an identification key by determining a value of a spacing between contacts according to an embodiment.

When a spacing between contacts (or vias) is reduced to have a value equal to or less than a specific spacing value, a probability that a first node and a second node are open may gradually decrease. When the value of the spacing is equal to or less than another specific spacing value, patterning between the first node and the second node may not be an open state.

A node may be formed by electrically connecting a conductive layer and a contact.

In an example, when a value of a spacing between a first contact 230 and a second contact 240 is equal to or greater than $S_{C.H}$ in a layout 311, all nodes may be open in a group 310. $S_{C.H}$ may be a minimum value of a spacing between contacts connected to conductive layers to guarantee that nodes are open. When the value of the spacing is equal to or greater than $S_{C.H}$, the nodes may be electrically open in a semiconductor manufacturing process.

When the value of the spacing between the first contact 230 and the second contact 240 is equal to or greater than $S_{C.H}$ in the layout 311, at least one of a pattern 1 312 and a pattern 2 313 may be formed. In both the pattern 1 312 and the pattern 2 313, a first node and a second node may be open, that is, not be shorted.

In another example, when the value of the spacing between the first contact 230 and the second contact 240 is equal to or less than $S_{C.L}$ in a layout 321, all nodes may be shorted in a group 320. $S_{C.L}$ may be a maximum value of a spacing between contacts (or vias) to guarantee that nodes are shorted. When the value of the spacing is equal to or less than $S_{C.L}$, the nodes may be electrically shorted in the semiconductor manufacturing process.

When the value of the spacing between the first contact 230 and the second contact 240 is equal to or less than $S_{C.L}$ in the layout 321, at least one of a pattern 1 322 and a pattern 2 323 may be formed. In both the pattern 1 322 and the pattern 2 323, a first node and a second node may be shorted.

In still another example, when the value of the spacing between the first contact 230 and the second contact 240 is equal to or greater than $S_{C.L}$ and equal to or less than $S_{C.H}$ in a layout 331, nodes may be shorted or open in a group 330. When the value of the spacing approaches $S_{C.L}$, a probability that the nodes are open may decrease, but a probability that the nodes are shorted may increase. When the value of the spacing approaches $S_{C.H}$, the probability that the nodes are open may increase. When one of the probabilities increases, randomness of a generated identification key may decrease.

A value of a spacing between contacts may be adjusted to be within a predetermined error range to sufficiently guarantee randomness of a generated identification key. By adjusting the value of the spacing, a probability that nodes are shorted and a probability that the nodes are not shorted may have the same value, for example, ½. Thus, it is possible to sufficiently guarantee the randomness of the generated identification key.

A value of a spacing corresponding to a probability of ½ that a first node and a second node are electrically open may be set to $S_{C.M}$.

$S_{C.M}$ may indicate that the nodes may be open or shorted theoretically at a probability of ½. When the value of the spacing is adjusted in the semiconductor manufacturing process, an error may also occur.

A first threshold may be a lower limit value of a spacing range allowing a difference between a probability that the first node and the second node are shorted and a probability that the first node and the second node are not shorted to be within a predetermined error range.

A second threshold may be an upper limit value of the spacing range allowing the difference between the probability that the first node and the second node are shorted and the probability that the first node and the second node are not shorted to be within the predetermined error range.

Figure 4:
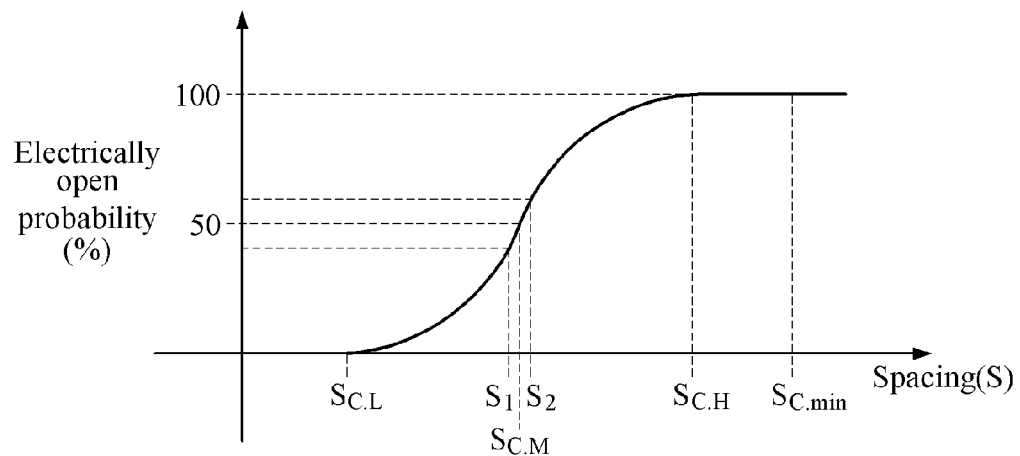
FIG. 4 is a graph illustrating a correlation between a probability that nodes are open and a value of a spacing between contacts according to an embodiment.

FIG. 4 is a graph illustrating a correlation between a probability that nodes are open and a value of a spacing between contacts according to an embodiment.

In the graph, a horizontal axis represents a value of a spacing between a first contact 230 and a second contact 240, and a vertical axis represents a probability that a first node and a second node are electrically open.

$S_{C.min}$ denotes a minimum spacing value according to a design rule that ensures that the first node and the second node are electrically open in a patterning layout of a semiconductor chip. $S_{C.H}$ denotes a minimum spacing value guaranteeing that the first node and the second node are electrically open. $S_{C.L}$ denotes a maximum value of the spacing between the first contact 230 and the second contact 240 to guarantee that the first node and the second node are electrically shorted. $S_{C.M}$ denotes a value of a spacing theoretically corresponding to 50%, that is, a probability that the first node and the second node are electrically open or a probability that the first node and the second node are electrically shorted When $S_{C.M}$ is set as the value of the spacing, randomness may be theoretically guaranteed. Even though a semiconductor chip is manufactured based on $S_{C.M}$, a process variation may occur. When a semiconductor chip is actually manufactured, a few errors may occur due to the process variation. In an actual process, it may be difficult to exactly determine $S_{C.M}$. Thus, the value of the spacing between the contacts may be set to be closest to $S_{C.M}$ by repeating a process of manufacturing a semiconductor chip based on different values of the spacing and measuring an identification key.

When the value of the spacing is within a predetermined error range in which randomness is theoretically guaranteed, a condition of an apparatus for generating an identification key may be satisfied.

Based on a value of a spacing between contacts, whether the first node and the second node are shorted may be determined. A range in which randomness is theoretically guaranteed may be set to be in a range of $S_1$ and $S_2$. The range of $S_1$ and $S_2$ may have a predetermined allowable error based on 50%.

$S_1$ may be a lower limit value of a spacing range allowing a difference between a probability that the first node and the second node are shorted and a probability that the first node and the second node are not shorted to be within a predetermined error range, and may be equal to or greater than a maximum spacing value guaranteeing that the first node and the second node are shorted.

$S_2$ may be an upper limit value of the spacing range allowing the difference between the probability that the first node and the second node are shorted and the probability that the first node and the second node are not shorted to be within the predetermined error range, and may be equal to or less than a minimum spacing value guaranteeing that the first node and the second node are open.

Figure 5:
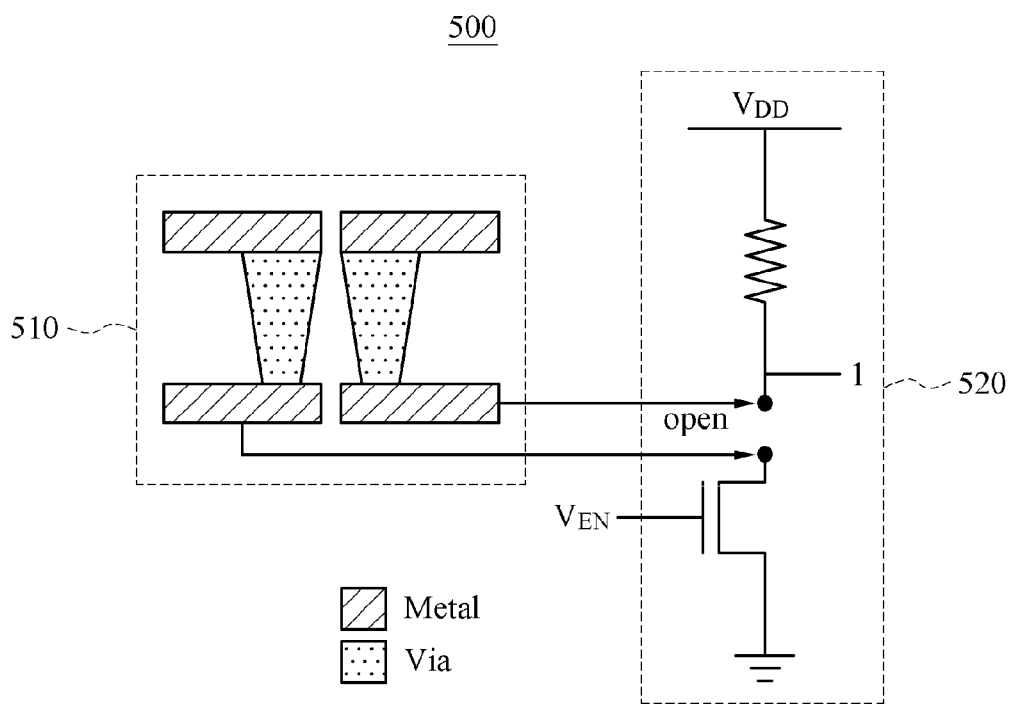
FIG. 5 is a diagram illustrating a circuit in an example in which selected contacts are open by a spacing between the contacts according to an embodiment.

FIG. 5 is a diagram illustrating a circuit in an example in which selected contacts are open by a spacing between the contacts according to an embodiment.

A portion 510 to connect a resistor and a transistor may include a first conductive layer, a first contact, a second conductive layer and a second contact. A reader 520 may determine whether a first node and a second node are electrically shorted, and may provide an identification key.

For example, the reader 520 may have a structure of a pull-down circuit including a resistor and an N-channel metal oxide semiconductor (NMOS) transistor. Based on whether the first node and the second node are open or shorted, a connection between an output node and a drain node of the NMOS transistor may be open or shorted.

When an enable signal transmitted to a gate of the NMOS transistor has a high value, and when the first node and the second node are open, an output value may be "1."

Figure 6:
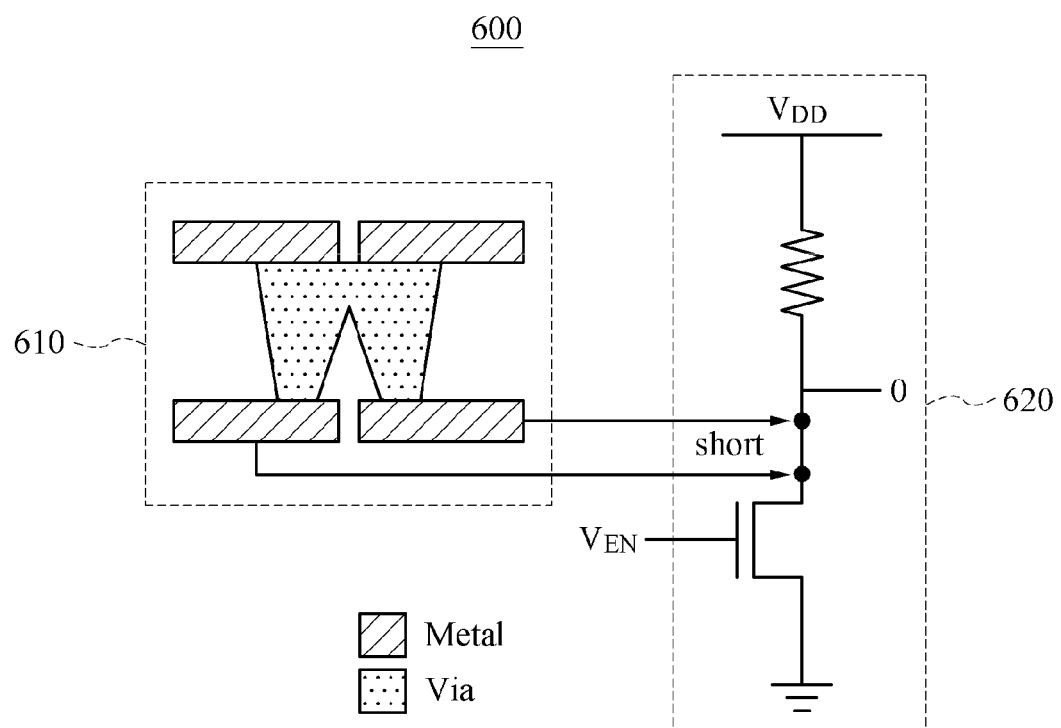
FIG. 6 is a diagram illustrating a circuit in an example in which selected contacts are shorted by a spacing between the contacts according to an embodiment.

FIG. 6 is a diagram illustrating a circuit in an example in which selected contacts are shorted by a spacing between the contacts according to an embodiment.

A portion 610 to connect a resistor and a transistor may include a first conductive layer, a first contact, a second conductive layer and a second contact. A reader 620 may determine whether a first node and a second node are electrically shorted, and may provide an identification key.

For example, the reader 620 may have a structure of a pull-down circuit including a resistor and an NMOS transistor. Based on whether the first node and the second node are open or shorted, a connection between an output node and a drain node of the NMOS transistor may be open or shorted.

When an enable signal transmitted to a gate of the NMOS transistor has a high value, and when the first node and the second node are shorted, an output value may be "0."

Figure 7:
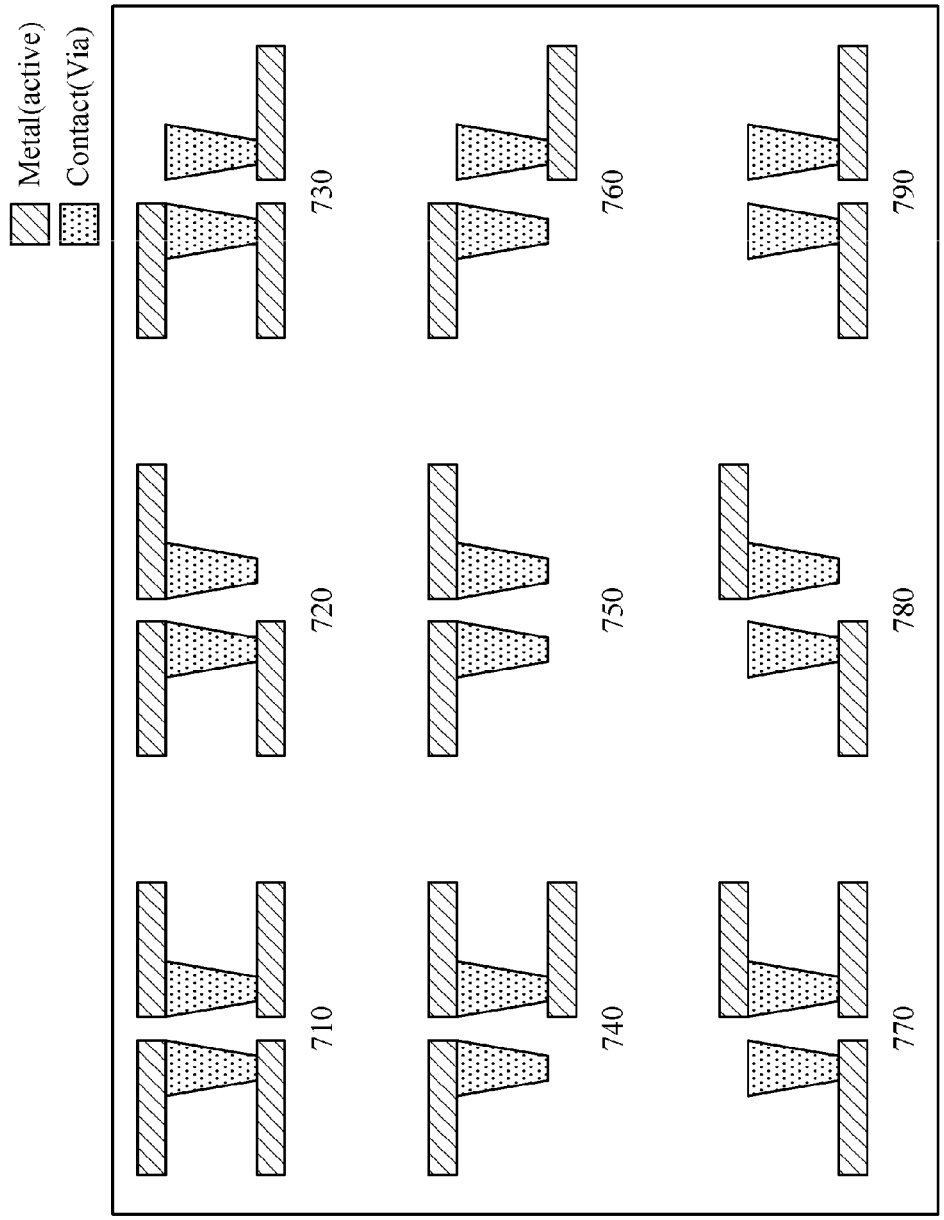
FIG. 7 is a diagram provided to describe various configurations of conductive layers connected to contacts according to an embodiment.

FIG. 7 is a diagram provided to describe various configurations of conductive layers connected to contacts according to an embodiment.

In a configuration 710, at least two first conductive layers may be connected to the first contact 230, and at least two second conductive layers may be connected to the second contact 240.

In configurations 720 and 730, at least two first conductive layers may be connected to the first contact 230, and at least one second conductive layer may be connected to the second contact 240.

In configurations 740 and 770, at least one first conductive layer may be connected to the first contact 230, and at least two second conductive layers may be connected to the second contact 240.

In configurations 760 and 780, a first conductive layer connected to the first contact 230, and a second conductive layer connected to the second contact 240 may be located to be crossed. In configurations 750 and 790, a first conductive layer connected to the first contact 230, and a second conductive layer connected to the second contact 240 may be located on the same plane.

Figure 8:
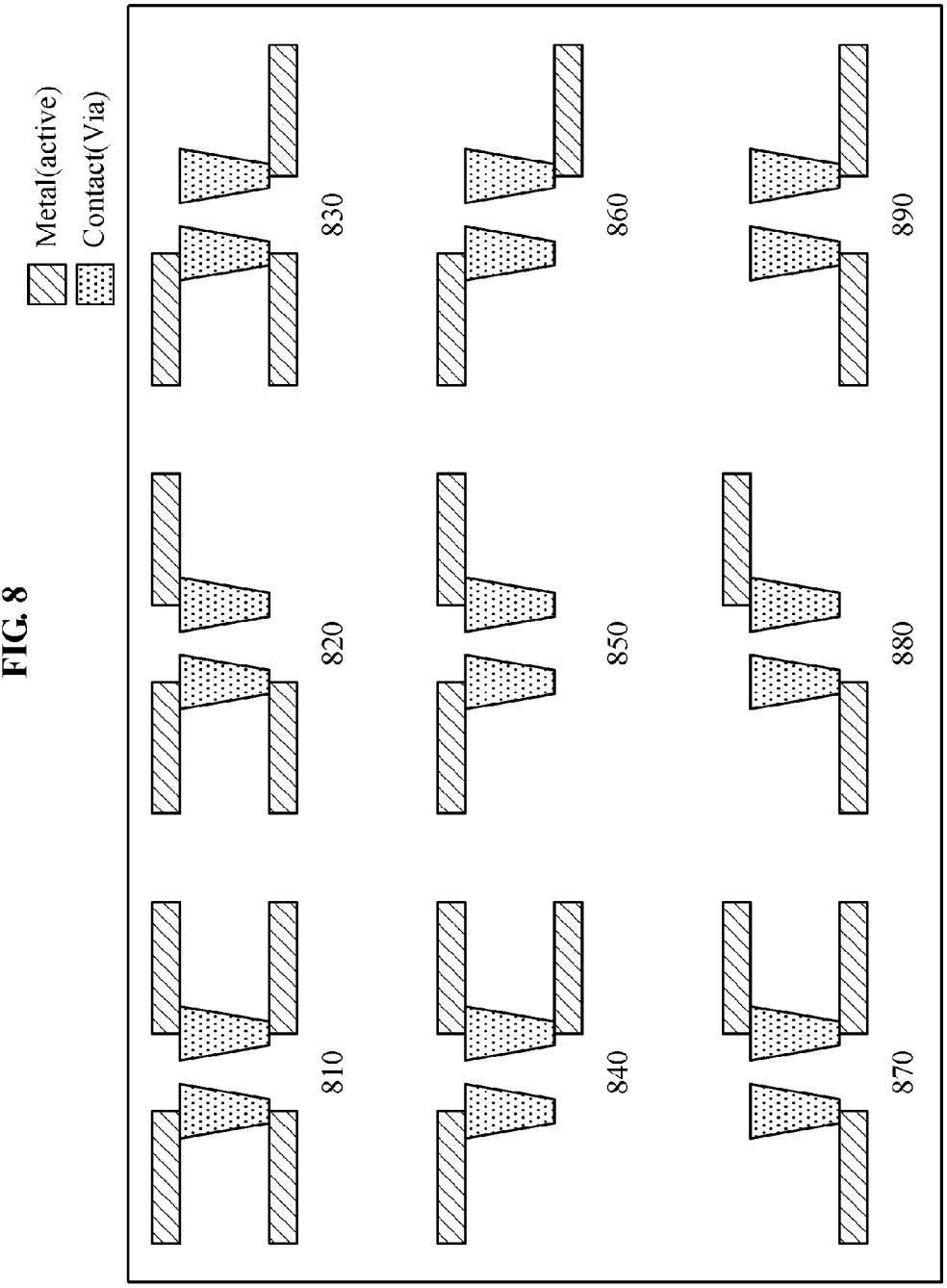
FIG. 8 is a diagram provided to describe various configurations of conductive layers connected to contacts according to another embodiment.

FIG. 8 is a diagram provided to describe various configurations of conductive layers connected to contacts according to another embodiment.

An edge of a contact may protrude further outwards than an edge of a conductive layer. A first contact may be connected to a first conductive layer, and an edge of the first contact may protrude further outwards than an edge of the first conductive layer. A second contact may be connected to a second conductive layer, and an edge of the second contact may protrude further outwards than an edge of the second conductive layer.

In a configuration 810, at least two first conductive layers may be connected to the first contact 230, and at least two second conductive layers may be connected to the second contact 240.

In configurations 820 and 830, at least two first conductive layers may be connected to the first contact 230, and at least one second conductive layer may be connected to the second contact 240.

In configurations 840 and 870, at least one first conductive layer may be connected to the first contact 230, and at least two second conductive layers may be connected to the second contact 240.

In configurations 860 and 880, a first conductive layer connected to the first contact 230, and a second conductive layer connected to the second contact 240 may be located diagonally opposite each other. In configurations 850 and 890, a first conductive layer connected to the first contact 230, and a second conductive layer connected to the second contact 240 may be located on the same plane.

Figure 9:
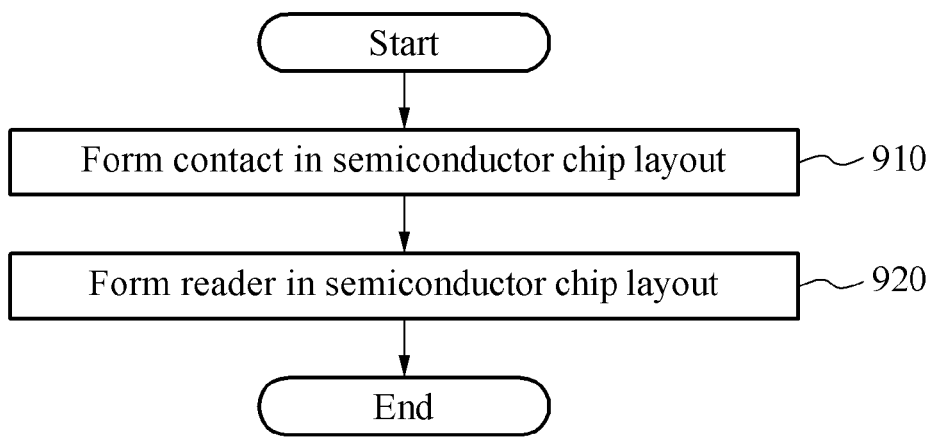
FIG. 9 is a flowchart illustrating a method of manufacturing an apparatus for generating an identification key according to an embodiment.

FIG. 9 is a flowchart illustrating a method of manufacturing an apparatus for generating an identification key according to an embodiment.

In operation 910, a first contact 230 connected to a first conductive layer, and a second contact 240 connected to a second conductive layer may be formed in a semiconductor chip layout. A first node may be formed by electrically connecting the first conductive layer and the first contact, and a second node may be formed by electrically connecting the second conductive layer and the second contact. In a patterning layout of a semiconductor chip, a spacing between the first contact 230 and the second contact 240 may be formed to have a value less than a minimum spacing value guaranteeing that the first node and the second node are not shorted.

A value of the spacing between the first contact 230 and the second contact 240 may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range. The second threshold may be an upper limit value of the range of the values of the spacing to allow the difference between the probability that the first node and the second node are shorted and the probability that the first node and the second node are not shorted to be within the predetermined error range.

Also, the first threshold may be greater than a maximum value of the spacing guaranteeing that the first node and the second node are shorted, and the second threshold may be less than a minimum value of the spacing guaranteeing that the first node and the second node are open.

For example, the predetermined error range may be set based on a specific value (for example, 50%) corresponding to the probability that the first node and the second node are shorted.

In this example, both a probability that the first node and the second node electrically are open and a probability that the first node and the second node are electrically shorted may exist, and may be utilized to generate a PUF.

When the value of the spacing is properly set in operation 910, whether the first node and the second node are shorted may be randomly determined by a process variation in a semiconductor process.

In operation 920, a reader may be formed in the semiconductor chip. The reader may determine whether the first node and the second node are electrically shorted and may provide an identification key based on an output value.

An identification key generation process and a circuit configuration of the reader have been described above with reference to FIGS. 5 and 6.

Figure 10:
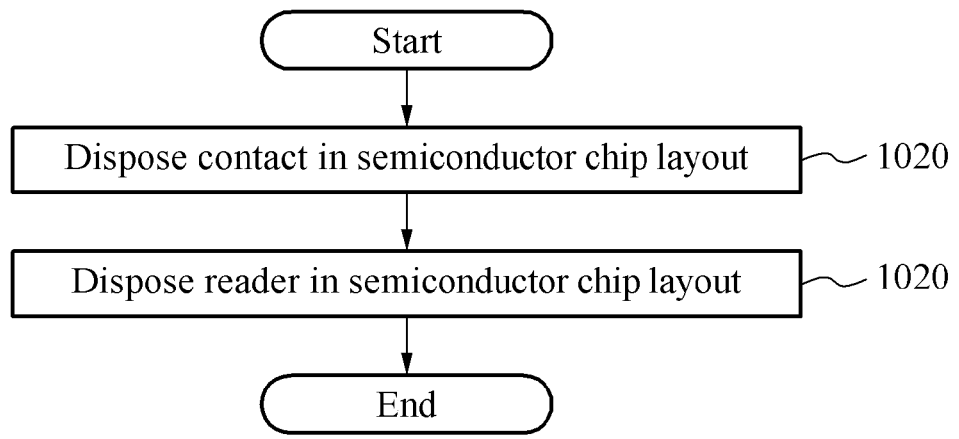
FIG. 10 is a flowchart illustrating a method of designing an apparatus for generating an identification key according to an embodiment.

FIG. 10 is a flowchart illustrating a method of designing an apparatus for generating an identification key according to an embodiment.

In operation 1010, a first contact 230 connected to a first conductive layer, and a second contact 240 connected to a second conductive layer may be disposed in a semiconductor chip. In a patterning layout of the semiconductor chip, the first contact 230 and the second contact 240 may be disposed so that a spacing between the first contact 230 and the second contact 240 may have a value less than a minimum spacing value guaranteeing that a first node and a second node are not shorted.

A value of the spacing between the first contact 230 and the second contact 240 may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range. The second threshold may be an upper limit value of the range of the values of the spacing to allow the difference between the probability that the first node and the second node are shorted and the probability that the first node and the second node are not shorted to be within the predetermined error range.

Also, the first threshold may be greater than a maximum value of the spacing guaranteeing that the first node and the second node are shorted, and the second threshold may be less than a minimum value of the spacing guaranteeing that the first node and the second node are open.

In operation 1010, whether the first node and the second node are shorted may be randomly determined by a process variation in a semiconductor process.

For example, a conductive layer may correspond to at least one of an N-well, a P-well, an N+ active, a P+ active, a poly and a metal.

In operation 1020, a reader may be formed in the semiconductor chip. The reader may determine whether the first node and the second node are electrically shorted and may provide an identification key based on an output value.

Figure 11:
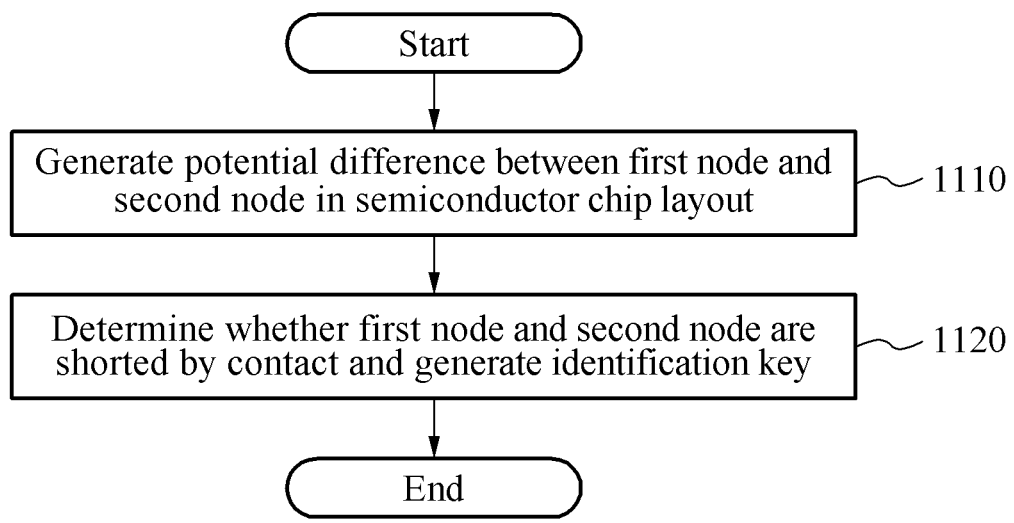
FIG. 11 is a flowchart illustrating a method of generating an identification key according to an embodiment.

FIG. 11 is a flowchart illustrating a method of generating an identification key according to an embodiment.

In operation 1110, a potential difference between a first node and a second node may be generated. The first node may be formed by electrically connecting a first conductive layer and a first contact, and the second node may be formed by electrically connecting a second conductive layer and a second contact.

For example, a value of a spacing between a first contact 230 and a second contact 240 may be less than a minimum spacing value according to a design rule that ensures that the first node and the second node are not shorted.

The value of the spacing between the first contact 230 and the second contact 240 may be equal to or greater than a first threshold and equal to or less than a second threshold. The first threshold may be a lower limit value of a range of values of the spacing to allow a difference between a probability that the first node and the second node are shorted and a probability that the first node and the second node are not shorted to be within a predetermined error range. The second threshold may be an upper limit value of the range of the values of the spacing to allow the difference between the probability that the first node and the second node are shorted and the probability that the first node and the second node are not shorted to be within the predetermined error range.

Also, the first threshold may be greater than a maximum value of the spacing guaranteeing that the first node and the second node are shorted, and the second threshold may be less than a minimum value of the spacing guaranteeing that the first node and the second node are open.

Whether the first node and the second node are shorted may be randomly determined by a process variation in a process of manufacturing the semiconductor chip.

In operation 1120, a reader may be formed in the semiconductor chip. The reader may determine whether the first node and the second node are electrically shorted and may provide an identification key based on an output value.

The units described herein may be implemented using hardware components, software components, and/or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An apparatus for generating an identification key, the apparatus comprising:
   a first contact connected to a first conductive layer included in a semiconductor chip, a first node being formed by electrically connecting the first contact and the first conductive layer;
   a second contact connected to a second conductive layer included in the semiconductor chip, a second node being formed by electrically connecting the second contact and the second conductive layer, and a value of a spacing between the first contact and the second contact in a patterning layout of the semiconductor chip being less than a minimum spacing value guaranteeing that the first node and the second node are not shorted; and
   a reader configured to determine whether the first node and the second node are electrically shorted and to generate an identification key.

2. The apparatus of claim 1, wherein the value of the spacing between the first contact and the second contact is equal to or greater than a first threshold and equal to or less than a second threshold,
   wherein the first threshold is a lower limit value of a range of values of the spacing to allow a difference between a probability that the first node and the second node are shorted and a probability that the first node and the second node are not shorted to be within a predetermined error range, and
   wherein the second threshold is an upper limit value of the range of the values of the spacing to allow the difference between the probability that the first node and the second node are shorted and the probability that the first node and the second node are not shorted to be within the predetermined error range.

3. The apparatus of claim 2, wherein the first threshold is greater than a maximum value of the spacing guaranteeing that the first node and the second node are shorted, and
   wherein the second threshold is less than a minimum value of the spacing guaranteeing that the first node and the second node are open.

4. The apparatus of claim 1, wherein whether the first node and the second node are shorted is randomly determined by a process variation occurring in a process of manufacturing the semiconductor chip.

5. The apparatus of claim 1, wherein an edge of the first node or an edge of the second node protrudes further outwards than an edge of the first conductive layer or an edge of the second conductive layer.

6. The apparatus of claim 1, wherein at least one of the first conductive layer and the second conductive layer corresponds to at least one of an N−well, a P−well, an N+ active, a P+ active, a poly and a metal included in the semiconductor chip.

7. An apparatus for generating an N-bit identification key, the apparatus comprising N unit cells that each generate a 1-bit digital value,
wherein at least one of the N unit cells comprises:
a first contact connected to a first conductive layer included in a semiconductor chip, a first node being formed by electrically connecting the first contact and the first conductive layer;
a second contact connected to a second conductive layer included in the semiconductor chip, a second node being formed by electrically connecting the second contact and the second conductive layer, and a value of a spacing between the first contact and the second contact in a patterning layout of the semiconductor chip being less than a minimum spacing value guaranteeing that the first node and the second node are not shorted; and
a reader configured to determine whether the first node and the second node are electrically shorted and to generate an identification key.

8. The apparatus of claim 7, wherein the value of the spacing between the first contact and the second contact is equal to or greater than a first threshold and equal to or less than a second threshold,
wherein the first threshold is a lower limit value of a range of values of the spacing to allow a difference between a probability that the first node and the second node are shorted and a probability that the first node and the second node are not shorted to be within a predetermined error range, and
wherein the second threshold is an upper limit value of the range of the values of the spacing to allow the difference between the probability that the first node and the second node are shorted and the probability that the first node and the second node are not shorted to be within the predetermined error range.

9. The apparatus of claim 8, wherein the first threshold is greater than a maximum value of the spacing guaranteeing that the first node and the second node are shorted, and wherein the second threshold is less than a minimum value of the spacing guaranteeing that the first node and the second node are open.

10. The apparatus of claim 7, wherein whether the first node and the second node are shorted is randomly determined by a process variation occurring in a process of manufacturing the semiconductor chip.

11. A method of manufacturing an apparatus for generating an identification key, the method comprising:
forming a first contact connected to a first conductive layer and a second contact connected to a second conductive layer in a semiconductor chip, a first node being formed by electrically connecting the first contact and the first conductive layer, and a second node being formed by electrically connecting the second contact and the second conductive layer; and
forming a reader configured to determine whether the first contact and the second contact are electrically shorted,
wherein a spacing between the first contact and the second contact in a patterning layout of the semiconductor chip has a value less than a minimum spacing value guaranteeing that the first node and the second node are not shorted.

12. The method of claim 11, wherein the spacing between the first contact and the second contact is formed to have a value equal to or greater than a first threshold and equal to or less than a second threshold,
wherein the first threshold is a lower limit value of a range of values of the spacing to allow a difference between a probability that the first node and the second node are shorted and a probability that the first node and the second node are not shorted to be within a predetermined error range, and
wherein the second threshold is an upper limit value of the range of the values of the spacing to allow the difference between the probability that the first node and the second node are shorted and the probability that the first node and the second node are not shorted to be within the predetermined error range.

13. The method of claim 11, wherein an edge of the first node or an edge of the second node protrudes further outwards than an edge of the first conductive layer or an edge of the second conductive layer.

* * * * *